William Duffner's improvements in Cultivators.

72004

PATENTED
DEC 10 1867

WITNESSES.
G. M. Leavitt
H. J. Holmes

William Duffner
Inventor.
Petersburg, Pike Co. Ind.
p. O. F. Mayhew
Attorney

UNITED STATES PATENT OFFICE.

WILLIAM DUFFNER, OF PETERSBURG, INDIANA.

IMPROVEMENT IN CULTIVATORS.

Specification forming part of Letters Patent No. 72,004, dated December 10, 1867.

*To all whom it may concern:*

Be it known that I, WILLIAM DUFFNER, of Petersburg, in the county of Pike and State of Indiana, have invented new and useful Improvements in Cultivators; and I do hereby declare that the following is a full, clear, and exact description thereof, reference being had to the accompanying drawings, making part of this specification.

My invention relates to mode of stocking or constructing the cultivator and to regulating the depth to which the shovels enter the soil, combined with means for raising the shovels off the ground when the implement is being moved to or from the field.

Figure 1:
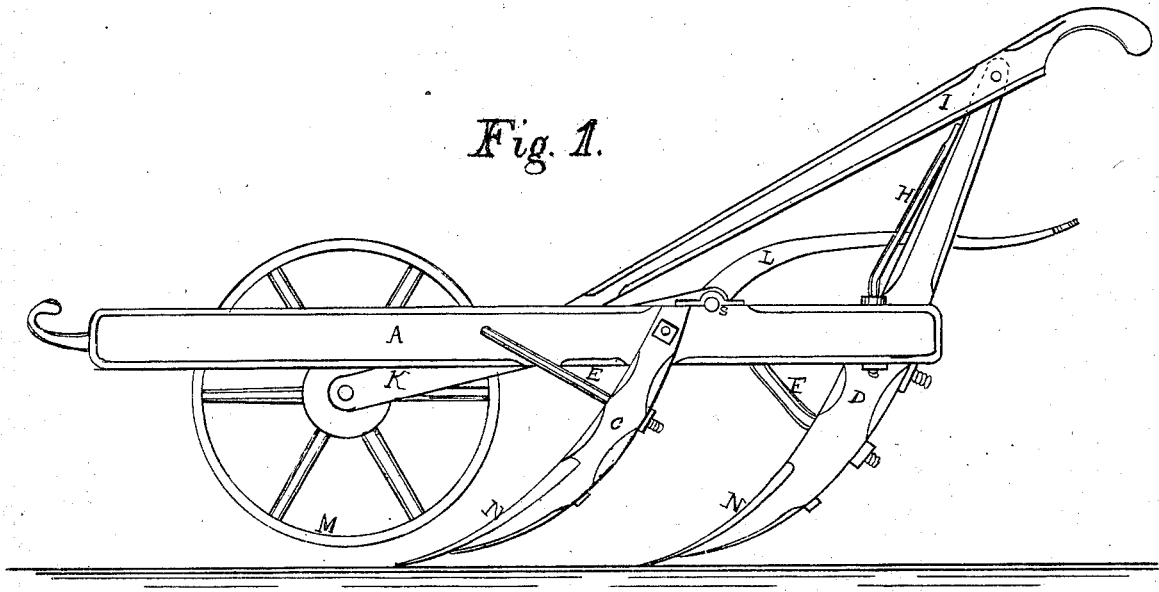
Figure 2:
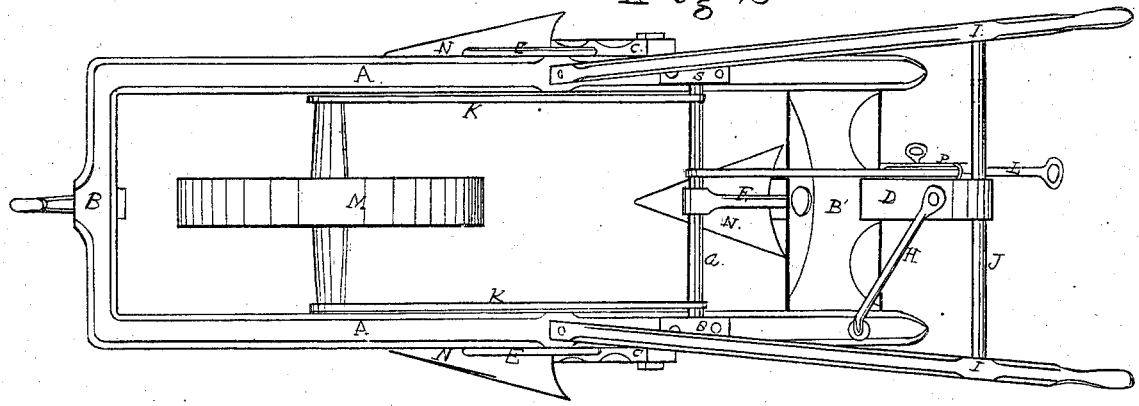

Figure 1 is a side elevation of the implement. Fig. 2 is a top or plan view of the same.

Similar letters of reference indicate corresponding parts in the several figures.

The following description will enable skilled artisans to make and use my invention.

The frame of the implement is of wood, rectangular in form, and consists of the side pieces, A A, and end pieces, B B'. The legs or stocks C C, to which the shovels N are attached, are halved on the side pieces, A, and bolted thereto, as shown, and are braced by the rods E. The stock D is gained into the rear end piece, B', to which it is securely bolted, and is braced by the rod F, the upper end of which is attached to the cross-rod G. The upper end of stock D is braced laterally by the rod H, as shown. The handles I have their lower ends secured to the side pieces, A, of the frame, and are attached near their upper ends to a wooden rod, J, running through the top of stock D. This construction and arrangement of the several parts give great strength and durability to the implement.

The device for raising the shovels out of the ground and for regulating the depth to which they enter it consists of the bars K, welded or otherwise secured by one end to a rod, G, hung in bearings S, and having a wheel, M, hung in their other ends, as shown. A lever, L, is welded or otherwise fastened to rod G, by which the wheel M may be raised or lowered at pleasure. The lever L is situated so that it lies against the stock D, and moves in a guide, P, attached to the stock. Holes are made in the guide and stock for the insertion of a pin to hold the lever in any position desired. The lever L and bars K being rigidly attached to the rod G, I am enabled to conveniently set the wheel M in any position desired to regulate the depth to which the shovels enter the ground, or to raise them entirely out of it when moving the implement to or from the field.

Having thus fully described my invention, what I claim as new, and desire to secure by Letters Patent, is—

The cultivator composed of the elements A B B' C D E F H I J N, and the device for regulating the depth of the shovels, composed of the elements G K L M P, all constructed and arranged as set forth.

WILLIAM DUFFNER.

Witnesses:
THADDEUS C. WITHERS,
HENRY M. SCOTT.